United States Patent Office.

WILLIAM H. JONES, OF NEWPORT, KENTUCKY, ASSIGNOR TO HIMSELF AND D. G. BRUMBACK, OF SAME PLACE.

Letters Patent No. 107,382, dated September 13, 1870.

IMPROVEMENT IN ROOFING COMPOSITION.

The Schedule referred to in these Letters Patent and making part of the same.

I, WILLIAM H. JONES, of Newport, in the county of Campbell and State of Kentucky, have invented a certain new and useful "Roofing Composition," of which the following is a specification.

Nature and Objects of the Invention.

My invention relates to a composition which is to e applied to canvas, stout paper, or some other suitable flexible fabric, the composition being of such a nature as to be both cheap and durable.

Specification.

The mode of preparing and using my composition is as follows:

I first take old and worn out India rubber, and, after placing it in a suitable retort, I subject it to a heat of about 312° Fahrenheit, which causes the rubber to melt. As soon as it has assumed a consistency of tar or thick molasses, it is drawn off into a tank or vat, and benzine added to it until it is thinned down to a semi-fluid or ordinary paint condition, the benzine which is employed for this purpose being the article of commerce which is used by house-painters. After the rubber has been thus diluted, there are added to it the following ingredients: Ten gallons of linseed oil, twenty-five pounds of dry ochre, twenty-five pounds of white or red lead, twenty pounds of hydraulic cement, fifty pounds of animal oil—this latter ingredient being obtained from the candle factories.

These ingredients having been thoroughly mixed into the diluted rubber fluid, the composition is ready for use, and is applied to the canvas, paper, or other fabric with a large flat brush.

After one coat of the composition has become thoroughly dried, another is applied and allowed to dry, and so on until the composition attains a sufficient thickess, when the roofing is ready for use.

In most cases three good coats of the composition will be sufficient to produce a perfectly water-proof roof.

Claim.

I claim as my invention—

The roofing composition, prepared of the ingredients and in the proportions substantially as herein described, and for the purpose set forth.

In testimony of which invention I hereunto set my hand.

WM. H. JONES.

Witnesses:
   GEO. H. KNIGHT,
   JAMES H. LAYMAN.